(12) United States Patent
Lübben

(10) Patent No.: US 7,647,439 B2
(45) Date of Patent: Jan. 12, 2010

(54) ELECTRONIC WARNING SYSTEM

(75) Inventor: Bernd Lübben, Korschenbroich (DE)

(73) Assignee: Novar GmbH, Neuss (DE)

( * ) Notice: Subject to any disclaimer, the term of this patent is extended or adjusted under 35 U.S.C. 154(b) by 193 days.

(21) Appl. No.: 11/832,734

(22) Filed: Aug. 2, 2007

(65) Prior Publication Data

US 2008/0012691 A1    Jan. 17, 2008

Related U.S. Application Data

(63) Continuation of application No. PCT/EP2006/007181, filed on Jul. 20, 2006.

(30) Foreign Application Priority Data

Aug. 5, 2005    (DE) ........................ 10 2005 037 047

(51) Int. Cl.
*G06F 13/00* (2006.01)
*G01R 31/00* (2006.01)
*G01R 31/08* (2006.01)
*G09F 25/00* (2006.01)
*G08B 21/00* (2006.01)
*G06F 11/00* (2006.01)

(52) U.S. Cl. ................. 710/100; 324/500; 324/522; 361/340; 340/286.01; 370/222; 370/223; 370/224

(58) Field of Classification Search ............ 361/340; 340/286.01, 659–664; 710/100; 370/222–224; 324/500, 522
See application file for complete search history.

(56) References Cited

U.S. PATENT DOCUMENTS

| | | | |
|---|---|---|---|
| 4,404,548 A | | 9/1983 | Mueller et al. |
| 4,423,456 A | * | 12/1983 | Zaidenweber ............. 361/77 |
| 4,575,842 A | * | 3/1986 | Katz et al. ............. 370/221 |
| 5,519,557 A | | 5/1996 | Kopera, Jr. et al. |
| 5,604,785 A | * | 2/1997 | Pryor et al. ............. 379/2 |
| 5,801,913 A | * | 9/1998 | Pittel ............. 361/71 |
| 6,141,195 A | | 10/2000 | Buhring et al. |
| 6,249,510 B1 | * | 6/2001 | Thompson ............. 370/223 |
| 6,304,422 B1 | * | 10/2001 | Sander et al. ............. 361/84 |
| 6,552,885 B1 | * | 4/2003 | Campbell et al. ............. 361/45 |
| 7,498,934 B2 | * | 3/2009 | Tusel ............. 340/506 |
| 2002/0076143 A1 | * | 6/2002 | Foltzer ............. 385/24 |

(Continued)

FOREIGN PATENT DOCUMENTS

DE    4322841 A1    1/1995

(Continued)

*Primary Examiner*—Paul R Myers
*Assistant Examiner*—Christopher A Daley
(74) *Attorney, Agent, or Firm*—Edell, Shapiro & Finnan, LLC

(57) ABSTRACT

A building control or danger warning system includes a two-core circular bus for voltage supply and for communication with bus user circuits connected to the cores of the circular bus. The bus user circuits are looped-into the circular bus via FET (field effect transistor) polarity-reversal protection bridges, thereby simplifying connection of the bus user circuits to the circular bus. A bus user circuit is located between d.c. connection terminals and connected in parallel with two protection bridges. The bus user circuit measures the voltage conditions and polarity of the a.c. voltage input terminals of the bridges. According to the results of the measurement, the bus is relayed to the subsequent bus user circuit.

12 Claims, 4 Drawing Sheets

U.S. PATENT DOCUMENTS

2005/0049754 A1* 3/2005 Ogawa et al. ............... 700/275
2007/0018819 A1* 1/2007 Streeb et al. ............. 340/572.1

FOREIGN PATENT DOCUMENTS

| | | |
|---|---|---|
| DE | 19850869 A1 | 5/2000 |
| EP | 0243928 A2 | 4/1987 |
| EP | 0468097 A2 | 1/1992 |
| EP | 0532787 A1 | 3/1993 |

* cited by examiner

ELECTRONIC WARNING SYSTEM

CROSS REFERENCE TO RELATED APPLICATIONS

This application is a continuation of International Application No. PCT/EP2006/007181, filed on Jul. 20, 2006, entitled "Building Control or Danger Warning System," which claims priority under 35 U.S.C. §119 to Application No. DE 102005037047.0 filed on Aug. 5, 2005, entitled "Building Control or Danger Warning System," the entire contents of which are hereby incorporated by reference.

FIELD OF THE INVENTION

The device described herein relates to building control or danger warning system (i.e., an electronic alert system) with a two-core circular bus for voltage supply and for communication with bus users.

BACKGROUND

Known building control or danger warning systems include a two-core circular bus to which bus users (e.g., alarm systems) are connected in parallel. In case of an interruption of the circular bus, two stub lines that may be operated independently from each other remain. In case of a short-circuit, the segment concerned may be disconnected by separate circuit breakers that are controlled by a central control station of the building control or danger warning system, so that, for example, shortened but operational stub lines still remain available.

In the following, the term "signal system" is used to include building control or danger warning systems.

In the course of assembly of signal systems of this kind, the bus users connected to the circular bus, and the circuit breakers, must be looped-into the circular bus. Bus users that are provided with polarity reversal protection and can be connected rapidly are known. However, the circuit breakers must be connected with correct polarities.

Color-coded conductors simplify the assembly of the circuit breakers only to a limited extent, because there is no world-wide uniform standard for color coding. Therefore time-consuming determination measurements on individual cores cannot be avoided, in particular when existing plants are being extended.

Furthermore, signal systems are known in which circuit breakers, usually in the form of relays or FETs (i.e., field effect transistors), are incorporated in the bus users. Bus users of this kind are connected in series into the circular bus, with care being taken to ensure correctness of polarity. Although the incorporation reduces the outlay of assembly work, it is still necessary to perform time-consuming determination measurements on the individual cores. Signal systems of this kind are known from DE 36 14 692 A1, DE 43 22 841 A1, CH 651 688 A5, and EP 468 097 A2.

A bus user circuit that is usable for a signal system of the generic kind as previously mentioned is known from DE 198 50 869 A1. This bus user circuit has two circuit breakers, each of which connects two cores of the circular bus. Therefore a bus user fed from both sides must be connected to the bus with the same designated polarity despite the polarity-reversal protection bridge, so that in this case too, determination measurements must be performed on the individual cores.

SUMMARY

The device described herein relates to a building control or danger warning system (i.e., an electronic alert system) with a two-core circular bus for voltage supply and for communication with bus users, each bus user comprising a bus user circuit connected to each of the cores of the circular bus via a polarity-reversal protection bridge. The bus user circuits are looped-into the circular bus via FET (field effect transistor) polarity-reversal protection bridges, thereby simplifying connection of the bus user circuits to the circular bus. A bus user circuit is located between d.c. connection terminals and connected in parallel with two protection bridges. The bus user circuit measures the voltage conditions and polarity of the a.c. voltage input terminals of the bridges. According to the results of the measurement, the bus is relayed to the subsequent bus user circuit.

The described electronic warning system simplifies the assembly of building control and danger warning systems. In accordance with an exemplary embodiment of the electronic warning system, each bus user comprises two polarity-reversal protection bridges via which it is looped-into the circular bus. The polarity-reversal protection bridges consist of FETs that are, at first, in a non-conducting state. The d.c. voltage terminals of the two bridges are connected in parallel, and a bus user circuit is located between the d.c. voltage terminals. The bus user circuit measures the voltage conditions and their polarities at the a.c. voltage inputs of the bridges, and ensures the operation of the bus user and the circular bus by driving the FETs. Owing to their symmetrical construction, the bus users can be installed very rapidly. Input and output terminals are first determined during operation, and it is therefore immaterial which conductor is connected to which pair of terminals. Furthermore, no additional components are necessary for effecting a circuit-breaking operation, because via a switching of the FETs of the output side bridge into a non-conducting state, the bus segment located behind this can be disconnected. Another advantage is that during operation the feeding of the bus user can be effected via its previous output terminal. This may be necessary, for example, when the circular bus is separated into two stub lines.

According to an exemplary embodiment of the electronic warning system, the bus user circuit receives its supply voltage at first via parasitic diodes of two FETs that are located to be diagonally opposite to each other in a bridge. Subsequently, the bus user circuit measures the voltage conditions at the a.c. voltage input terminals of the bridges. When a voltage is applied at exactly one bridge, the FETs with current flowing through their parasitic diodes, and two FETs that are located to be diagonally opposite to each other in the other bridge, are switched to be conducting. Thereby the supply voltage is switched to the next bus user, or the circular bus is closed when the output of the bus user is connected to the central control station of the signal system.

According to a further embodiment, the bus user circuit holds all FETs in the non-conducting state when it detects a supply voltage at the a.c. voltage input terminals of both bridges. An equalization of the potential between the two feed voltages is thereby prevented.

In Germany, there is a regulation that a circular bus of a building control or danger warning system be fed only from one side during normal operation. In other countries (e.g., Great Britain) the feeding of a circular bus (e.g., a fire alarm system bus) is effected basically from both sides in order to keep voltage losses as low as possible. This case is reflected in another embodiment of the electronic warning system. Here a feeding from both sides is detected as being "correct", and the corresponding FETs are rendered non-conducting.

In another advantageous embodiment, the bus user has available a self-sufficient current supply or a component for storing energy (i.e., a capacitor or battery), e.g., in the form of a gold cap condenser. This makes possible a rapid restoration of the circular bus following a short circuit.

In a further embodiment, the bus user circuit comprises a memory. The bus user circuit can store data in the memory, the data relating to, for example, operating conditions, faults in the bus, or instructions from the central control station.

In yet another embodiment of the electronic warning system, some of the bus users are signaling units. This makes it possible to monitor environmental and operational conditions and to report these conditions to a control station. Signaling units of this kind may be, for example, danger alarms (e.g., fire alarms). The operational conditions to be monitored may be, for example, conditions of doors, locks, windows, or smoke outlets.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

In the following, the system will be farther illustrated with the aid of schematic drawings and flow charts, where.

DETAILED DESCRIPTION

Figure 1:
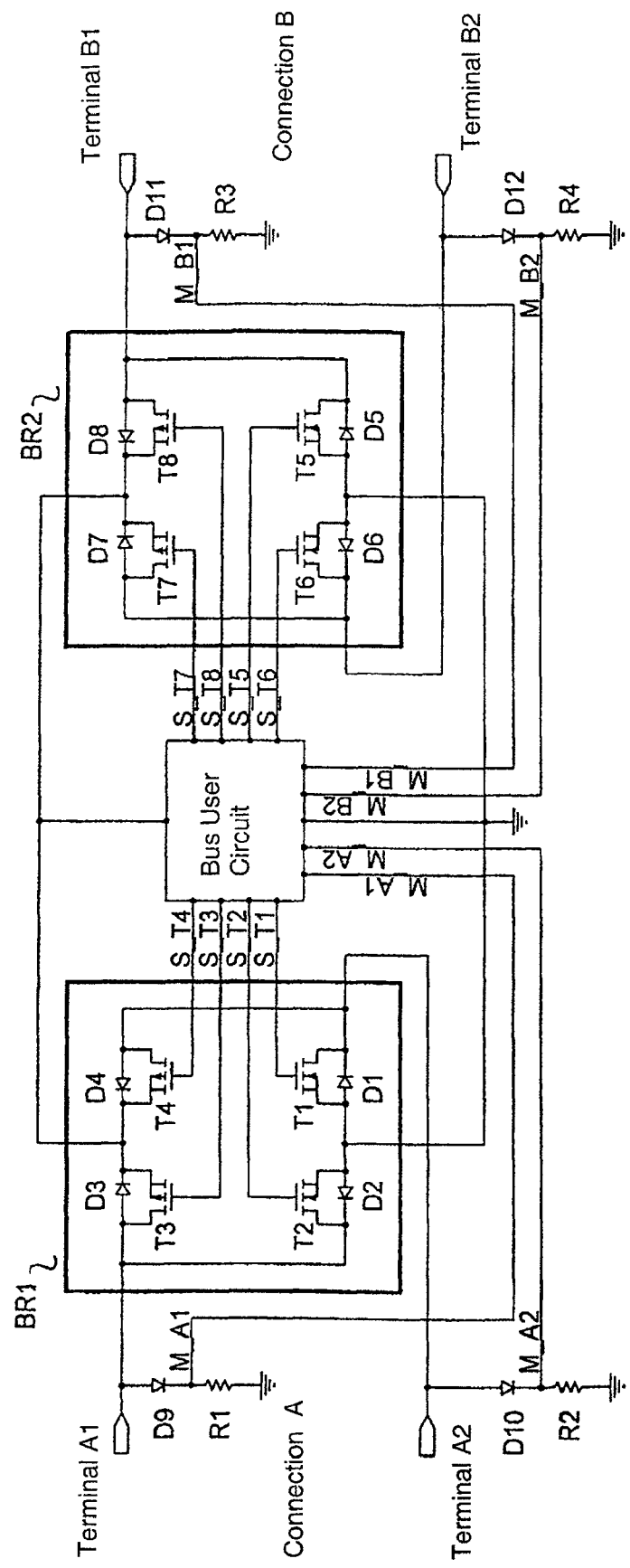
FIG. 1 is a schematic drawing of a first exemplary embodiment.

FIG. 1 shows a bus user circuit for communication with a control station that is connected into a signal system via a two-core bus to a d.c. voltage supply. The bus user circuit comprises two pairs of terminals A1, A2 and B1, B2 via which the bus user circuit is connected in series into the bus system. Each of the pairs of terminals (connections) A and B is connected to a.c. voltage input terminals of a bridge rectifier BR1 and BR2, respectively. The d.c. voltage output terminals of the two bridge rectifiers BR1 and BR2 are connected in parallel. The bus user circuit also is connected in parallel with these output terminals of the two bridge rectifiers BR1 and BR2. The bridge rectifiers each consist of four FETs (BR1 of T1, T2, T3 and T4; and BR2 of T5, T6, T7 and T8). In order to make clear the manner of operation, the parasitic diode paths of the FETs (T1 to T8) have been additionally drawn as diodes D1 to D8. The terminals A1, A2, B1 and B2 are each connected to ground via diodes D9, D10, D11 and D12 and resistors R1, R2, R3 and R4. The bus user circuit determines via each of the terminals M_A1, M_A2, M_B1 and M_B2 the voltage drop at the resistors M_A1, M_A2, M_B1 and M_B2, respectively. The FETs (T1 to T8) are driven according to the measurement results. If, for example, feeding is effected only via the pair of terminals A1, A2, then specifically the FETs having current-carrying parasitic diode paths, i.e., either T1 and T3, or T2 and T4, are first switched to be conductive. Subsequently, the bus is passed on to the connection B by suitable driving (see FIG. 3) of the FETs T5 to T8.

Figure 2:
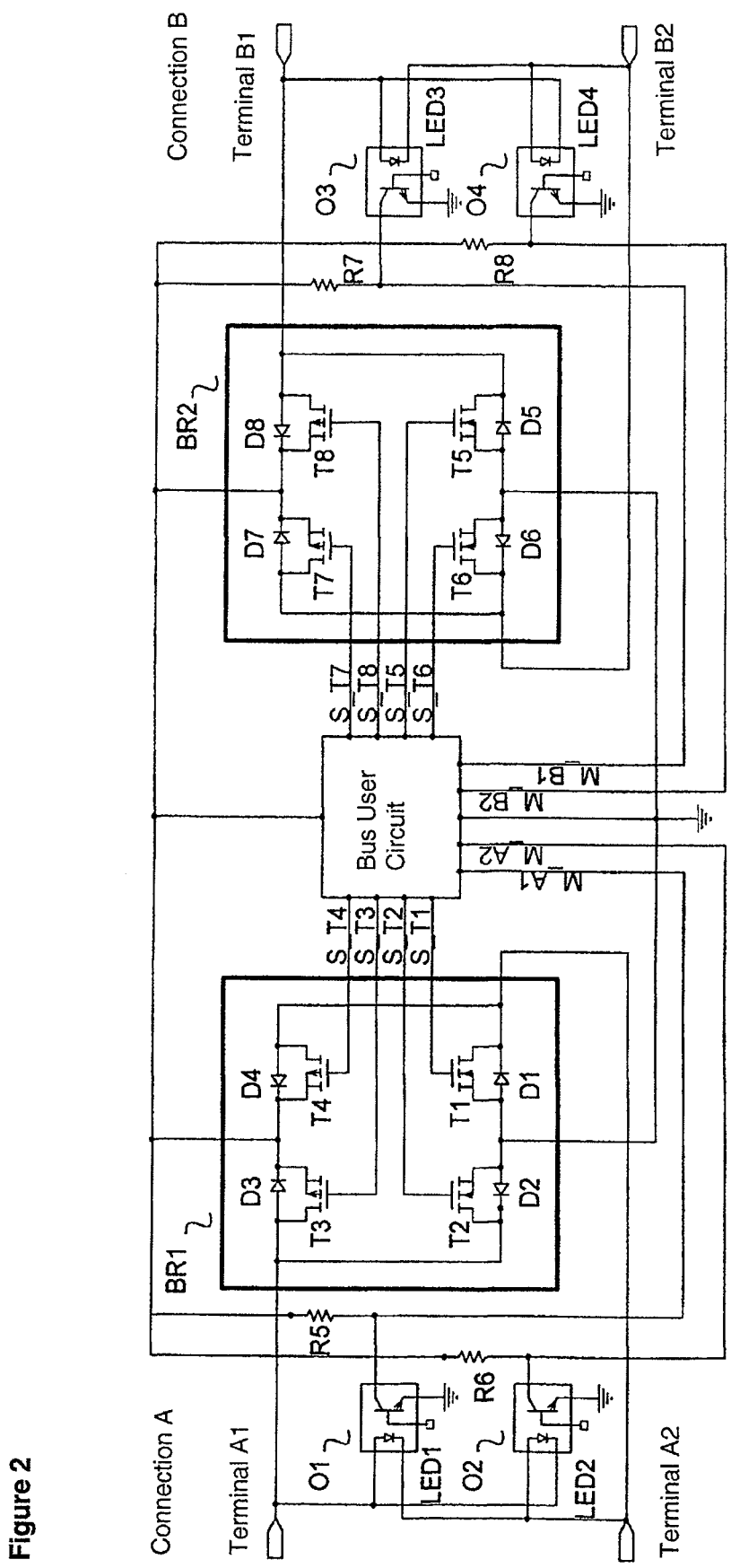
FIG. 2 is a schematic drawing of a second exemplary embodiment.

FIG. 2 schematically shows an embodiment in which the voltage conditions and the signs at the pairs of terminals A1, A2 and B1, B2 are determined via four optoelectronic couplers O1, O2, O3, O4 instead of via the resistors R1 to R4 as in FIG. 1. Each of the terminals A, B is connected to two LEDs disposed antiparallel (A with LED1 and LED2; and B with LED3 and LED4). Each of the LEDs (LED1 to LED4) is a component of an optoelectronic coupler O1, O2, O3 and O4, respectively. One of the output terminals of each optoelectronic coupler O1 to O4 is connected to ground and the other to the positive d.c. output terminals of the bridge rectifiers BR1 and BR2 via a resistor (O1 via R5, O2 via R6, O3 via R7, and O4 via R8). The bus user circuit measures the voltage drop at each of the resistors R5, R6, R7 and R8 via the terminals M_A1, M_A2, M_B1 and M_B2, respectively. When a d.c. voltage is applied to a terminal (A or B), exactly one optoelectronic coupler supplies a signal "0". The input (A or B) and its polarity are determined from the information as to which optoelectronic coupler supplies the signal. If the circular bus is being fed with d.c. from both sides, then exactly two optoelectronic couplers that are assigned to different terminals A, B supply a signal "0". The bus user circuit evaluates the signals from the optoelectronic couplers, and then drives the FETs T1 to T8 according to the signals, analogous to the case of FIG. 1.

Figure 3A:
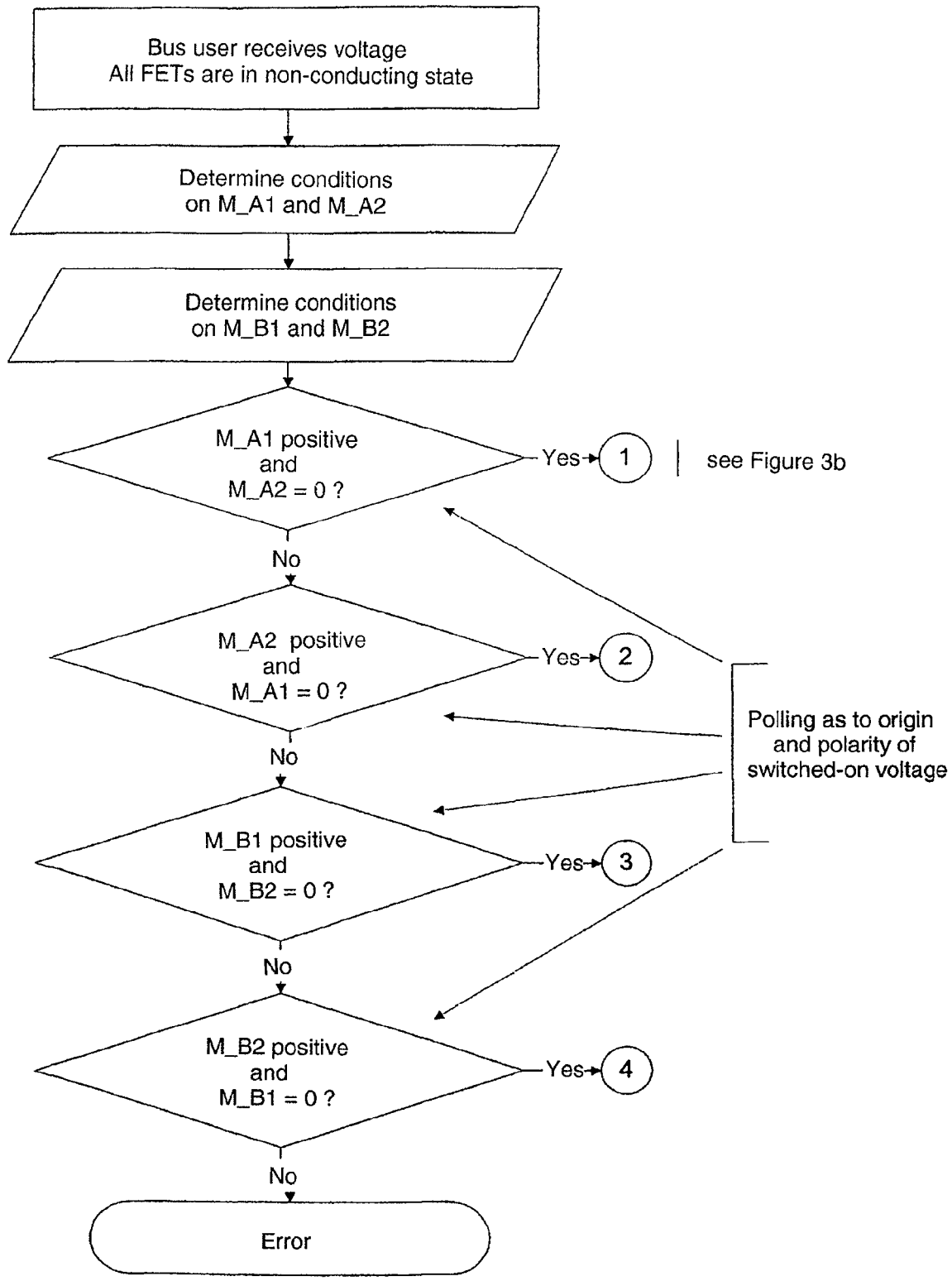
FIGS. 3a and 3b are flow charts.
Figure 3B:
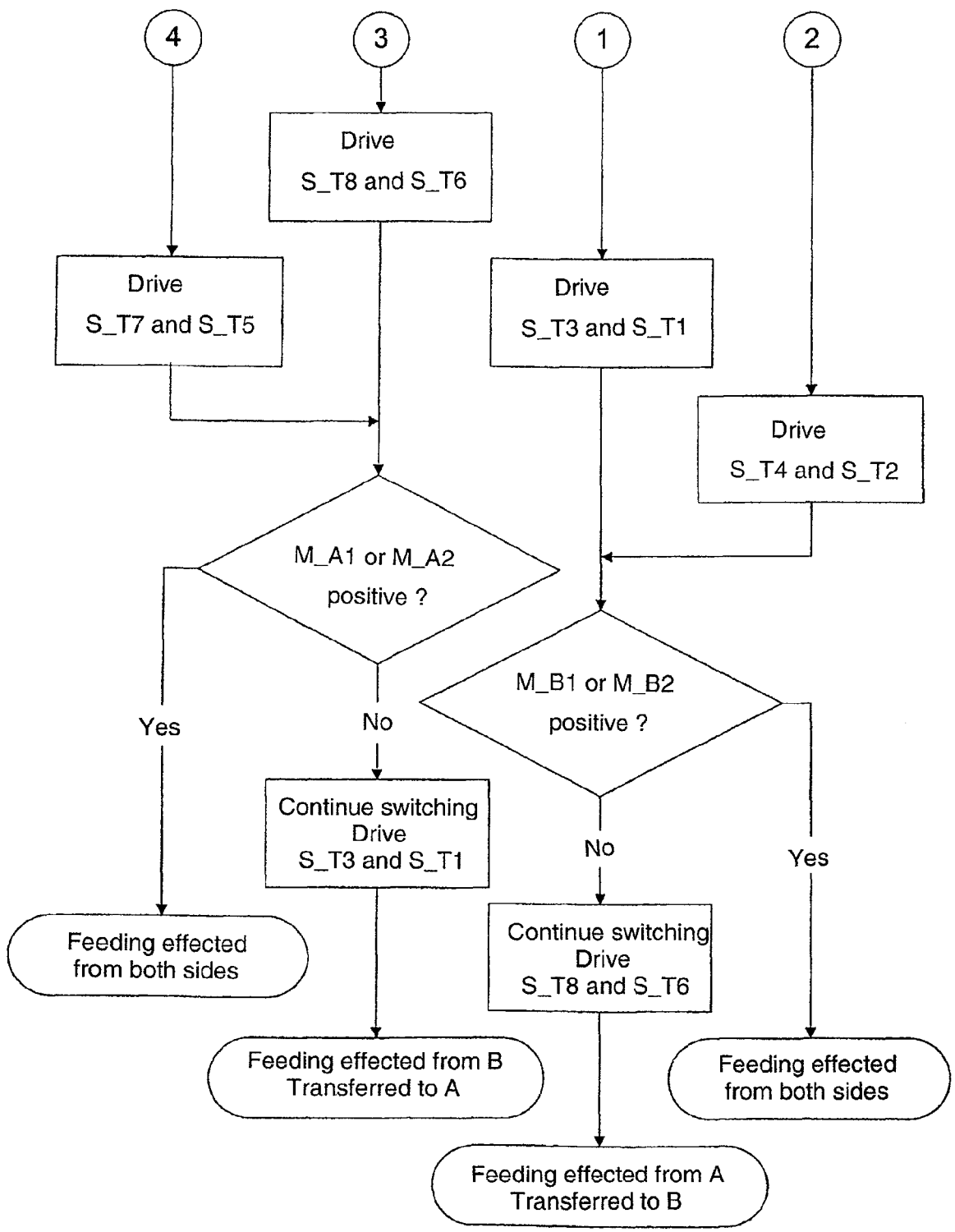

The driving of the FETs T1 to T8 in dependence upon the signals at the terminals M_A1, M_A2, M_B1 and M_B2 is illustrated as a flow chart in FIG. 3. The chart starts with the bus user receiving a voltage, and all FETs being in a non-conducting state. The voltage at the terminals A1, A2, B1, and B2 is then measured. If the feeding of the bus user circuit is effected via exactly one pair of terminals, then the corresponding FETs become conductive by an application of a suitable gate voltage. Apart from this, the bus is further relayed by driving of the gate of two FETs of the bridge that is not connected to the pair of input terminals. If, for example, the feeding is effected via the terminals A1 and A2 with the voltage at A1 being positive in comparison with that at A2, then a gate voltage is applied to the FETs T1 and T3 via S_T1 and S_T3 in order to reduce the voltage drop at the diode paths. After it has been ensured that no voltage is being applied to the pairs of terminals B1 and B2, the FETs T8 and T6 are driven via S_T8 and S_T6 in order to switch the bus onto the pair of terminals B1 and B2 that is now the pair of output terminals.

If the feeding is effected from both sides, i.e., a voltage is being applied also to the pair of terminals B1, B2, then this is ascertained and memorized (i.e., stored in memory), and can be reported to the central control station.

In another programming of the bus user circuit, for example, for application in a system with obligatory feeding of the circular bus from both "ends" connected to the central control station, the bus user circuit switches through the corresponding FETs of both bridges BR1 and BR2.

If the voltage supply collapses, and the bus user circuit comprises an energy store (i.e., a capacitor or battery), for example, in the form of a gold cap condenser, then the bus user circuit can detect the voltage supply collapse as being a fault, and can store and report the fault to the central control station following a restoration of the circular bus. Accordingly, a programmed reaction can occur at the central control station, for example, a malfunction report, possibly attended by actuation of a telephone-line selector, or an entry into an event memory.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. An electronic warning system, comprising:
a two-core circular bus; and
a plurality of bus users, the circular bus extending through and connecting the bus users and supplying voltage and communication to the plurality of connected bus users, each bus user comprising:
two pairs of terminals;
a bus user circuit connected in series with the two-core circular bus via the two pairs of terminals, the bus user circuit being configured to receive a supply voltage and to measure the voltage and signs on the connected bus cores; and
first and second polarity-reversal protection bridges connecting the bus user circuit to each of the cores of the circular bus, wherein the bus user circuit is connected in parallel between d.c. output terminals of the protection bridges, each bridge including:
a branch comprising four FETs (field effect transistors) with parasitic diodes polarized in the direction of current-flow, thereby initializing the FETs in a non-conducting state;
wherein the bus user circuit is further configured to control the FETs of the first and second protection bridges in response to a supply voltage being applied to at least one of the polarity-reversal protection bridges.

2. The electronic warning system according to claim 1, wherein, in response to a supply voltage being applied to only one of the polarity-reversal protection bridges, the bus user circuit is configured to switch from a non-conducting state to a conducting state two FETs of one of the bridges with parasitic diodes through which current flows, and to switch from a non-conducting state to a conducting state two FETs, located diagonally opposite to each other, of the other one of the bridges.

3. The electronic warning system according to claim 1, wherein, in response to a supply voltage being applied to both bridges, the bus user circuit is configured to maintain all FETs of the first and second bridges in a non-conducting state.

4. The electronic warning system according to claim 1, wherein, in response to a supply voltage being applied to both bridges, the bus user circuit is configured to close the circular busses at correct polarity via driving the corresponding FETs.

5. The electronic warning system according to claim 1, wherein the bus user circuit further comprises an energy storing unit.

6. The electronic warning system according to claim 5, wherein the energy storing unit comprises a gold cap condenser.

7. The electronic warning system according to claim 1, wherein the bus user circuit further comprises:
a data memory configured to store data relating to a failure of the supply voltage as a fault, wherein the bus user circuit is configured to report the fault to a central control station in response to the bus user being reconnected to the central control station.

8. The electronic warning system according to claim 7, wherein at least one of the bus users is a signaling unit.

9. The electronic warning system according to claim 8, wherein the signaling unit is configured to monitor environmental or operational conditions and to report the conditions to the control station.

10. The electronic warning system according to claim 1, further comprising:
four diodes; and
four resistors, each resistor being connected in series with a respective one of the diodes and each diode/resistor pair connecting one of the cores of the circular bus to ground;
wherein the bus user circuit is connected to respectively determine a voltage drop at each of the resistors.

11. The electronic warning system according to claim 1, further comprising:
four optoelectronic couplers; and
four resistors, each resistor being connected between a respective one of the optoelectronic couplers and a respective d.c. output terminal of one of the bridges;
wherein each of the optoelectronic couplers is connected to ground and connected to one of the cores of the two-core circular bus;
wherein the bus user circuit is connected to respectively determine a voltage drop at each of the resistors.

12. The electronic warning system according to claim 11, wherein each optoelectronic coupler further comprises an LED, wherein the LEDs of optoelectronic couplers connected to a first core of the two-core circular bus are connected in series and the LEDs of the optoelectronic couplers connected to a second core of the two-core circular bus are connected in series.

* * * * *